United States Patent
Aoshima et al.

(10) Patent No.: US 6,631,014 B1
(45) Date of Patent: Oct. 7, 2003

(54) IMAGE READING APPARATUS

(75) Inventors: Chikara Aoshima, Zama (JP); Shigeru Kawasaki, Yokohama (JP); Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/498,630

(22) Filed: Feb. 7, 2000

(30) Foreign Application Priority Data

Feb. 10, 1999 (JP) .............................. 11-032701

(51) Int. Cl.$^7$ .............................. H04N 1/04; H04N 1/24
(52) U.S. Cl. .................... 358/497; 358/472; 358/474
(58) Field of Search .................. 358/497, 474, 358/472

(56) References Cited

U.S. PATENT DOCUMENTS

| | | | |
|---|---|---|---|
| 4,713,698 A | 12/1987 | Takahashi et al. | 358/296 |
| 4,786,971 A | 11/1988 | Kaneko et al. | 358/209 |
| 5,917,620 A | 6/1999 | Hasegawa et al. | 358/513 |
| 5,936,223 A | 8/1999 | Suzuki et al. | 235/462 |
| 5,973,425 A * | 10/1999 | Aoshima | 310/49 R |
| 6,108,108 A * | 8/2000 | Peng | 358/497 |
| 6,330,084 B1 * | 12/2001 | Chiang | 358/497 |
| 6,335,802 B1 | 1/2002 | Hung-Che et al. | 358/296 |
| 6,464,416 B1 | 10/2002 | Aoshima | 400/120.01 |

FOREIGN PATENT DOCUMENTS

| | | |
|---|---|---|
| JP | 61-182168 | 11/1986 |
| JP | 63-87945 | 4/1988 |

\* cited by examiner

*Primary Examiner*—Edward Coles
*Assistant Examiner*—Houshang Safaipour
(74) *Attorney, Agent, or Firm*—Fitzpatrick, Cella, Harper & Scinto

(57) ABSTRACT

An image reading apparatus includes a scanning unit arranged to move along an original mounting table, a motor for driving the scanning unit, the motor being mounted on the scanning unit, a substrate having a control circuit for controlling the scanning unit and the motor, a frame arranged to house therein the scanning unit, the motor and the substrate, the substrate being fixed to the frame, and a flexible printed circuit board having one end thereof connected to the substrate and another end thereof connected to both the scanning unit and the motor.

2 Claims, 8 Drawing Sheets

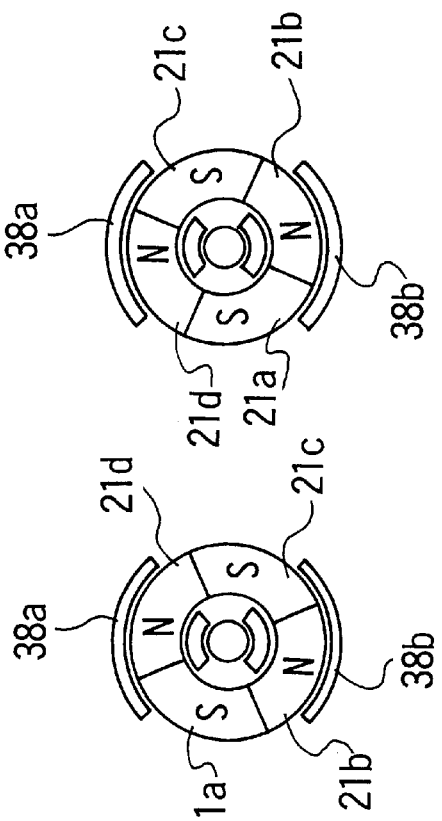
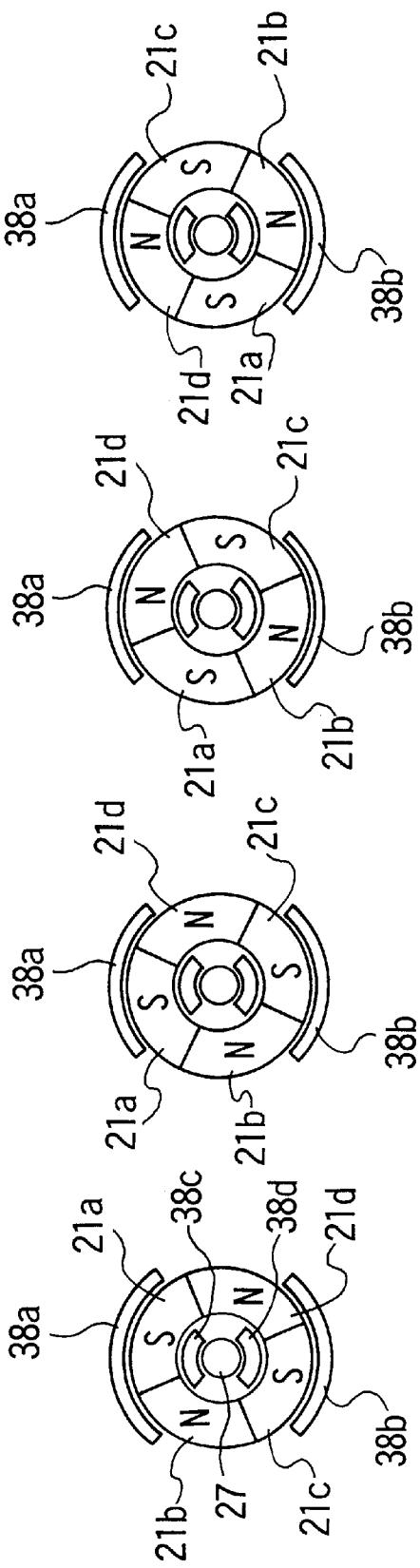
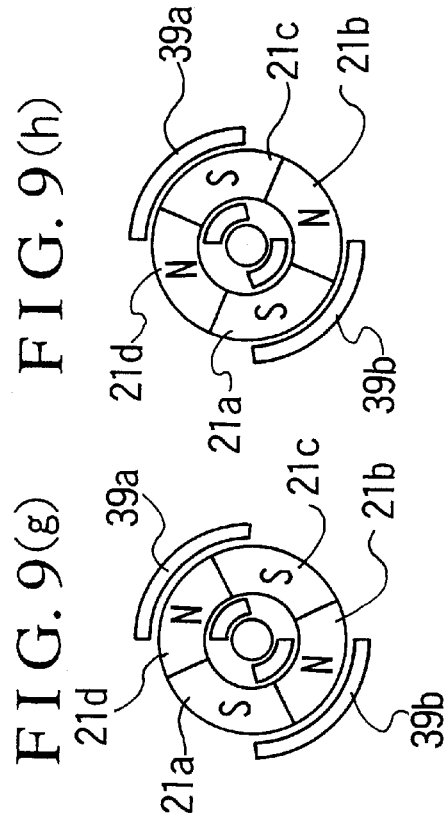
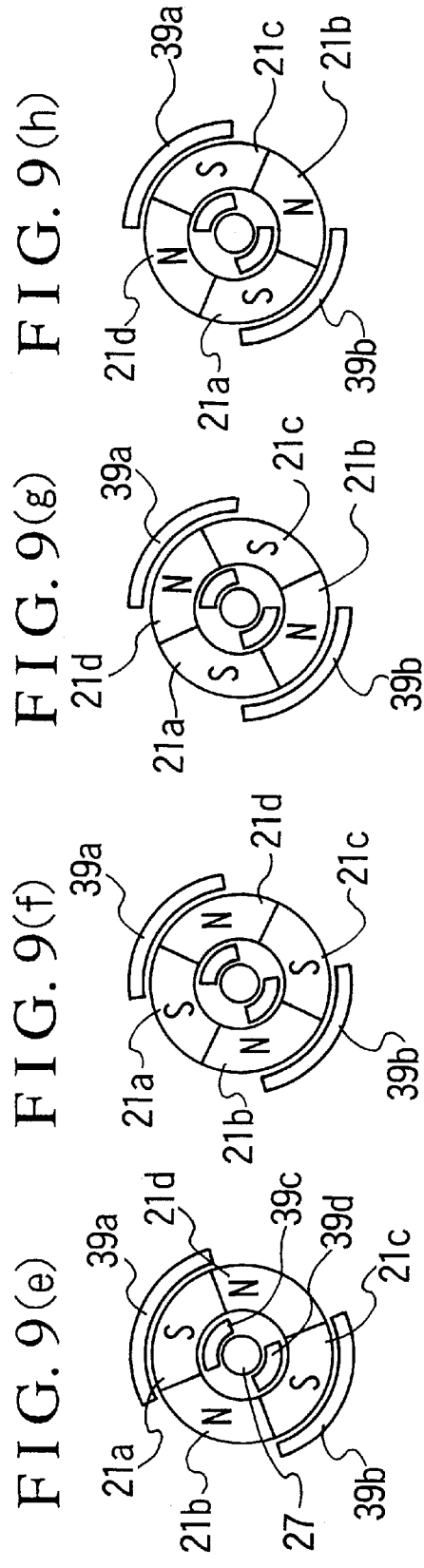

IMAGE READING APPARATUS

BACKGROUND OF THE INVENTION

1. Field of the Invention

The present invention relates to an image reading apparatus, such as an image scanner arranged to be connected to the terminal of a personal computer, or an original reading part of a copying machine or a facsimile machine, and more particularly to an image reading apparatus arranged to read an original set on an original mounting table while moving a scanning unit.

2. Description of Related Art

In most of conventional image reading apparatuses such as image scanners or the like, a motor is fixed to the body of the apparatus, a timing belt is hooked between the motor and a scanning unit, and the scanning unit is moved with the power of the motor. FIG. 6 shows by way of example the conventional arrangement.

In FIG. 6, reference numeral 100 denotes a body frame, reference numeral 101 denotes an original mounting table glass, and reference numeral 102 denotes a scanning unit. The scanning unit 102 is composed of an illumination light source, a light receiving element, a lens array arranged to image, on the light receiving element, reflection light from an original, etc.

A guide shaft 104 is fixed to the body frame 100 at its two ends. A slider 105, which is fixed to the scanning unit 102, slidably engages the guide shaft 104. An auxiliary guide shaft 106 is fixed to the body frame 100 at its two ends. An auxiliary slider 107, which is fixed to the scanning unit 102, slidably engages the auxiliary guide shaft 106. A motor 108 is fixed to the body frame 100. A pulley 109 is fixed to the output shaft of the motor 108. An idle pulley 110 is rotatably mounted on the body frame 100. A timing belt 111 is hooked on the idle pulley 110 and the pulley 109 and is fixed to the scanning unit 102 at a part thereof. A control circuit 112 is arranged on the body frame 100.

The control circuit 112 is connected to the motor 108 by a lead wire 113 and to the scanning unit 102 by a flexible printed circuit board 114. The control circuit 112 is thus arranged to control the driving action of the motor 108 and the action of the scanning unit 102.

The scanning unit 102 is arranged to be caused to move along the surface of the original mounting table glass 101 by the normal or reverse rotation of the motor 108. A stepping motor of at least two phases, which excels an ordinary DC motor in controllability and cost, is employed as the motor 108.

With the image reading apparatus arranged in the manner as described above, the motor 108 and the scanning unit 102 are electrically connected to the control circuit 112 separately from each other. The separate connection has caused an increase in size of a connection part and also an increase in assembly cost. The timing belt 111 is arranged in a loop which occupies a space. The space cannot be utilized for other purposes and thus has hindered reduction in size of the apparatus.

Further, the timing belt 111 must be arranged to have a sufficiently high tension for accurately moving the scanning unit 102. However, the high tension of the timing belt 111 has caused an increase in driving load. The increased driving load has caused side pressure exerted on the output shaft of the motor 108 to degrade the durability of the motor 108.

In addition to the above drawbacks, the size of the motor is very large and the large size of the motor has caused an increase in size of the apparatus.

It is conceivable to solve the problem in respect to the motor by arranging the motor on a moving body of the image reading apparatus, as disclosed in Japanese Utility Model Application No. Sho 61-182168 (Japanese Laid-open Utility Model Application No. Sho 63-87945). However, this solution has been inadequate because it still leaves the motor in a large size. Besides, the contrived allocation of the motor has not allowed reduction in thickness of the apparatus to a sufficient degree.

BRIEF SUMMARY OF THE INVENTION

The invention is directed to the solution of the problems of the prior art described above.

It is, therefore, an object of the invention to provide a compact image reading apparatus.

It is another object of the invention to provide an image reading apparatus having a motor of excellent durability.

To attain the above objects, in accordance with an aspect of the invention, there is provided an image reading apparatus which comprises a scanning unit arranged to move along an original mounting table, a motor for driving the scanning unit, the motor being mounted on the scanning unit, a substrate having a control circuit for controlling the scanning unit and the motor, a frame arranged to house therein the scanning unit, the motor and the substrate, the substrate being fixed to the frame, and a flexible printed circuit board having one end thereof connected to the substrate and another end thereof connected to both the scanning unit and the motor.

In accordance with another aspect of the invention, there is provided an image reading apparatus which comprises a scanning unit arranged to move along an original mounting table, a motor for driving the scanning unit, the motor being mounted on the scanning unit, a frame arranged to house therein the scanning unit and the motor, a wire having both ends thereof fixed to the frame, and a pulley mounted on the scanning unit and arranged to be rotated by rotation of the motor, the wire being wound around the pulley by an integer number of turns.

In accordance with a further aspect of the invention, there is provided an image reading apparatus which comprises a scanning unit arranged to move along an original mounting table, and a motor for driving the scanning unit, the motor being mounted on the scanning unit, wherein a plurality of coil terminals of the motor extrude in the same direction from one side of the motor, and the motor is fixed to the scanning unit in such a posture that a plane formed by the plurality of coil terminals extend in parallel with a bottom surface of the scanning unit.

In accordance with a still further aspect of the invention, there is provided an image reading apparatus which comprises a scanning unit arranged to move along an original mounting table, and a motor for driving the scanning unit, the motor being mounted on the scanning unit, wherein the motor is in such a shape that a diameter D thereof and a height L thereof are in a relation of $L \geq D$, and the motor is mounted on the scanning unit in such a way that an output shaft of the motor is parallel with a bottom surface of the scanning unit.

In accordance with a still further aspect of the invention, there is provided an image reading apparatus which comprises a scanning unit arranged to move along an original mounting table, and a motor for driving the scanning unit, the motor being mounted on the scanning unit, wherein the motor has a magnet of cylindrical shape having an outer circumferential surface thereof divided into n parts which are magnetized to alternately have different poles in a circumferential direction thereof, and first and second coils which are respectively disposed on two sides of the magnet in a direction of an output shaft of the motor, a first outer magnetic pole and a first inner magnetic pole which are arranged to be excited by the first coil are respectively opposed to an outer circumferential surface and an inner circumferential surface of one end of the magnet, and a second outer magnetic pole and a second inner magnetic pole which are arranged to be excited by the second coil are opposed to an outer circumferential surface and an inner circumferential surface of another end of the magnet.

In accordance with a still further aspect of the invention, there is provided an image reading apparatus which comprises a scanning unit arranged to move along an original mounting table, a motor for driving the scanning unit, the motor being mounted on the scanning unit, a frame arranged to house therein the scanning unit and the motor, a wire having at least one end thereof fixed to the frame through elastic means, and a pulley mounted on the scanning unit and arranged to be rotated by rotation of the motor, the wire being wound around the pulley.

The above and other objects and features of the invention will become apparent from the following detailed description of a preferred embodiment thereof taken in connection with the accompanying drawings.

BRIEF DESCRIPTION OF THE SEVERAL VIEWS OF THE DRAWING

FIGS. 9(a) to 9(h) are diagrams for explaining the rotating action of the rotor of the stepping motor shown in FIG. 7.

DETAILED DESCRIPTION OF THE INVENTION

Hereinafter, a preferred embodiment of the invention will be described in detail with reference to the drawings.

Figure 1:
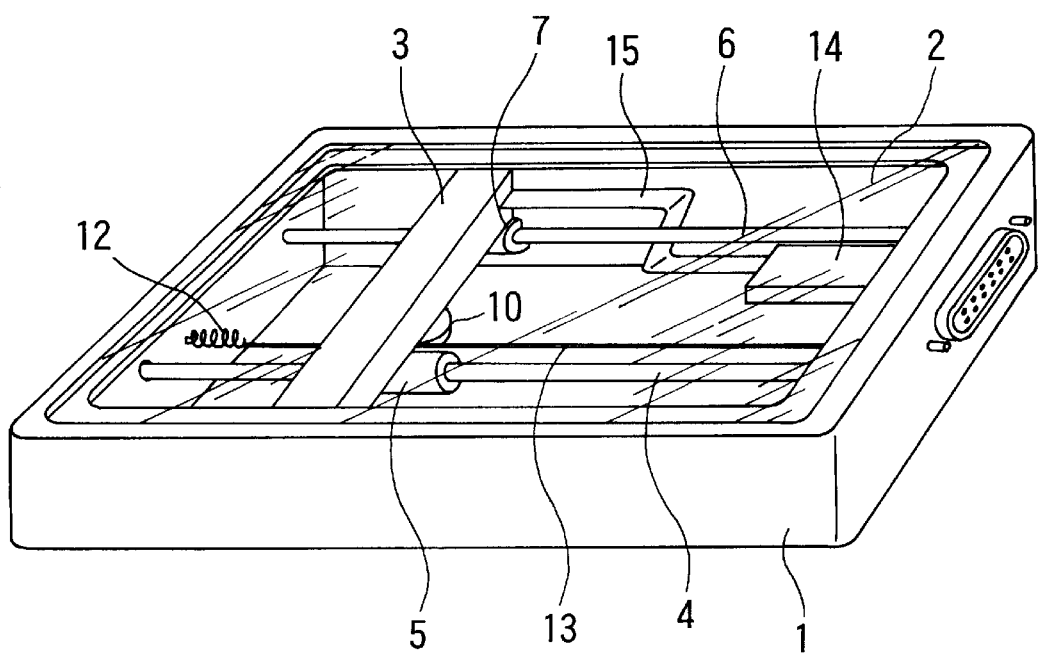
FIG. 1 is a perspective view showing the appearance of an image reading apparatus according to an embodiment of the invention.
Figure 2:
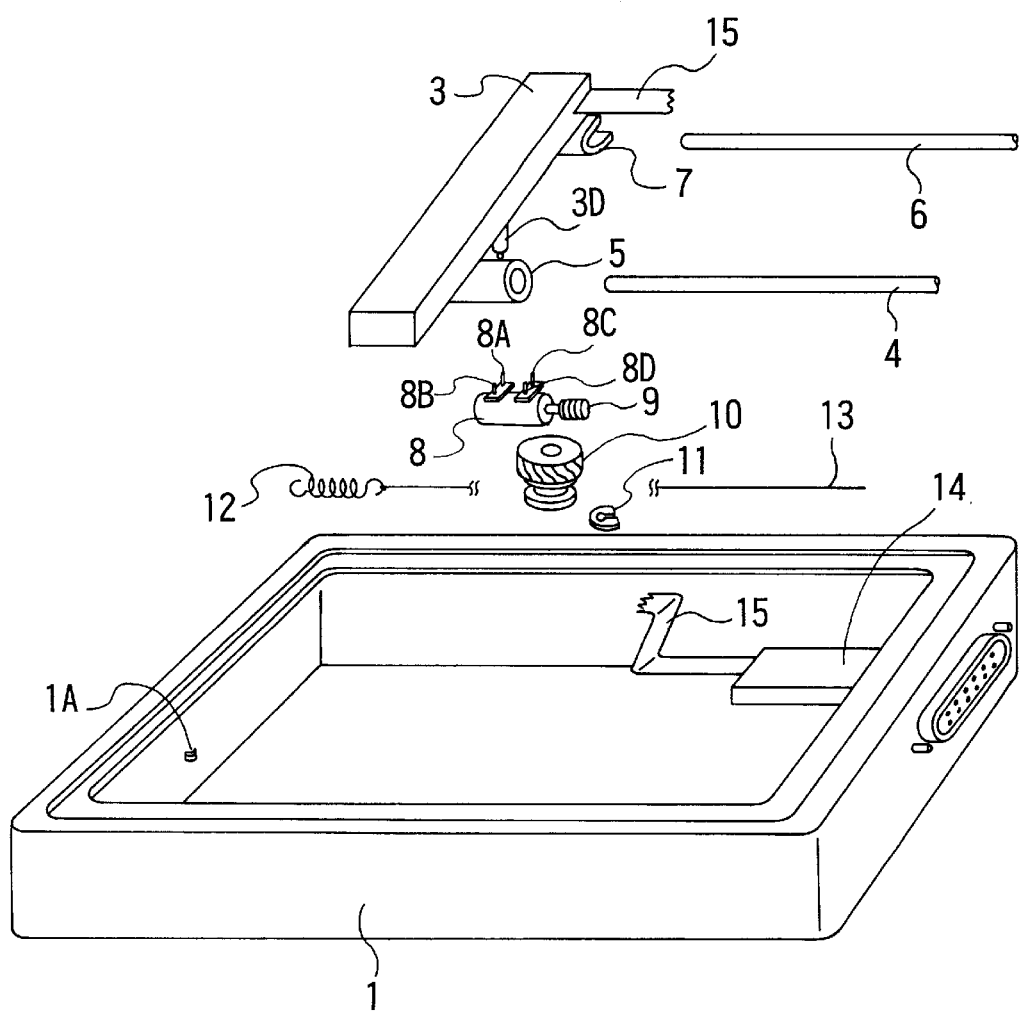
FIG. 2 is an exploded perspective view showing the main component elements of the image reading apparatus shown in FIG. 1.
Figure 3:
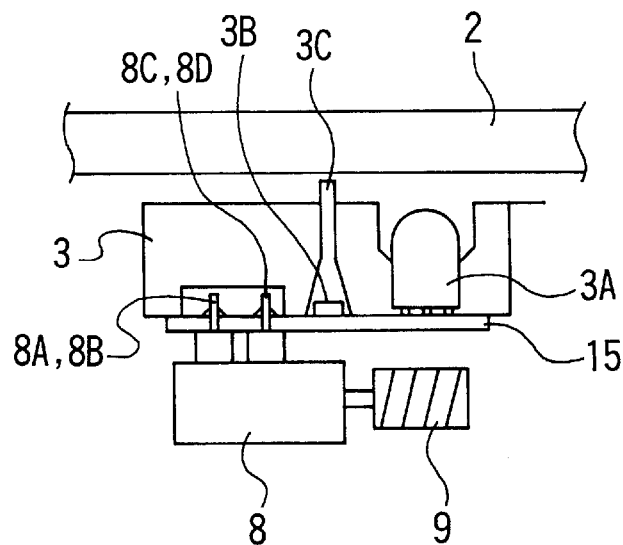
FIG. 3 is a sectional view of a scanning unit included in the image reading apparatus shown in FIG. 1.
Figure 4:
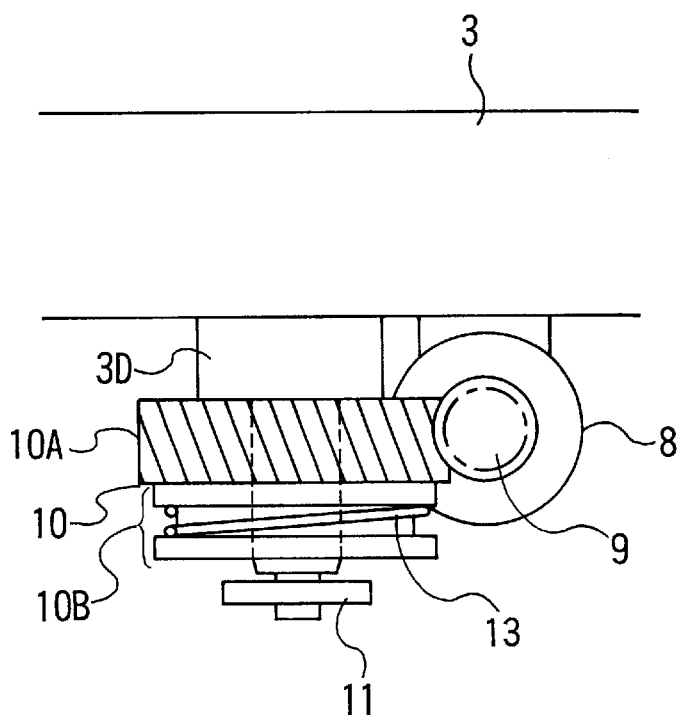
FIG. 4 is a side view of a driving part attached to the bottom surface of the scanning unit of the image reading apparatus shown in FIG. 1.
Figure 5:
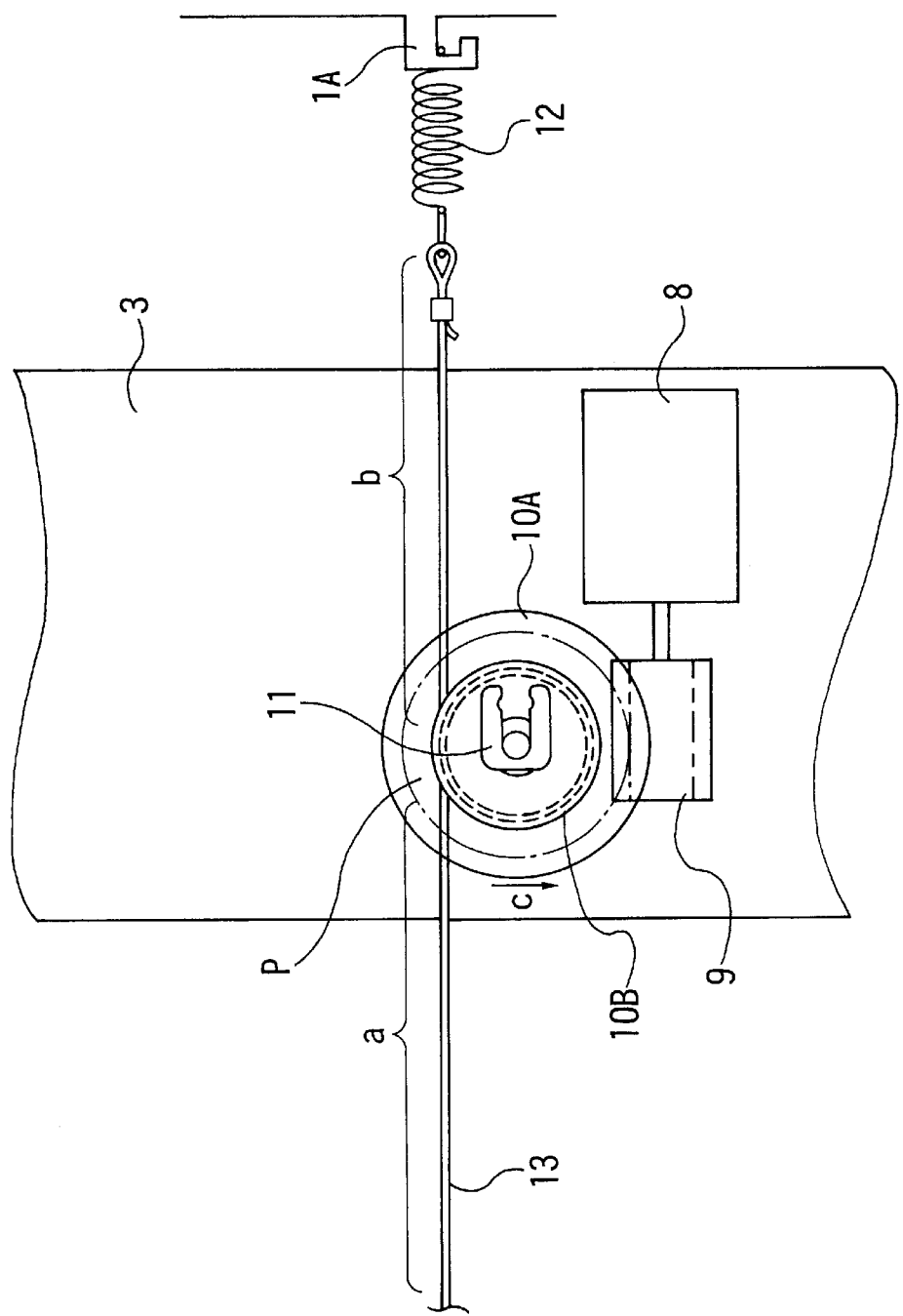
FIG. 5 is a plan view showing the scanning unit of the image reading apparatus shown in FIG. 1 as viewed from below, with importance attached particularly to the driving part.
Figure 6:
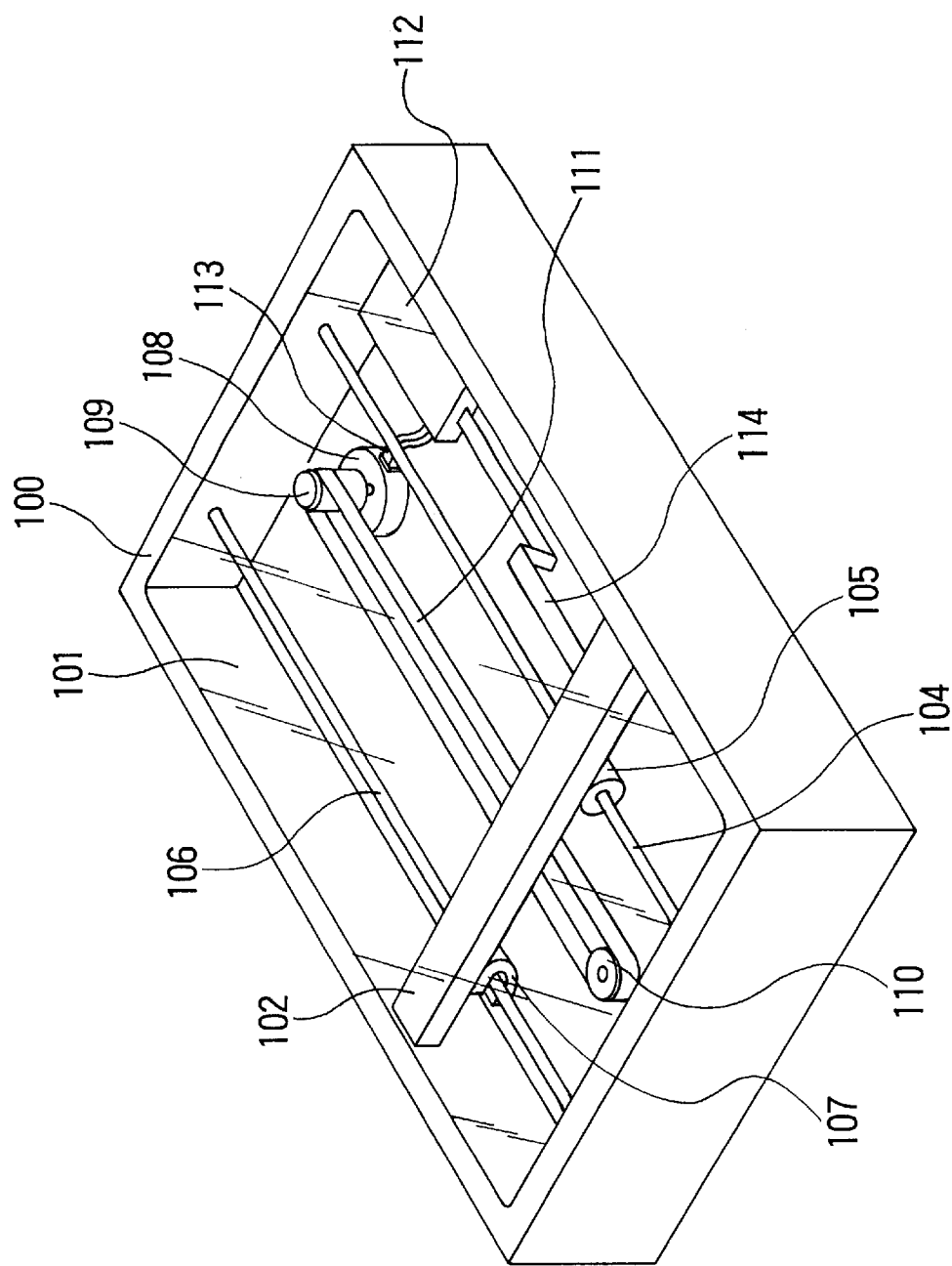
FIG. 6 is a perspective view showing the appearance of a conventional image reading apparatus.

FIGS. 1 to 5 show an image reading apparatus according to the embodiment of the invention. FIG. 1 shows the appearance of the image reading apparatus. FIG. 2 shows in an exploded perspective view the main component elements of the image reading apparatus. FIG. 3 is a sectional view showing in part a scanning unit and a motor included in the image reading apparatus. FIG. 4 is a side view of a driving part of the image reading apparatus. FIG. 5 is a plan view showing the driving part as viewed from below.

In FIGS. 1 to 5, reference numeral 1 denotes a body frame, reference numeral 2 denotes an original mounting table glass, and reference numeral 3 denotes a scanning unit. On the scanning unit 3, there are mounted an illumination light source 3A, a light receiving element 3B, a lens array 3C which is arranged to image reflection light on the light receiving element 3B, etc. A guide shaft 4 has its two ends fixed to the body frame 1. A slider 5 is fixed to the scanning unit 3 in such a way as to have the scanning unit 3 fittingly engage the guide shaft 4 in a slidable state. An auxiliary guide shaft 6 has its two ends fixed to the body frame 1. An auxiliary slider 7 is fixed to the scanning unit 3 in such a way as to have the scanning unit 3 fittingly engage the auxiliary guide shaft 6 in a slidable state. The scanning unit 3 is thus arranged to be slidable over and along the surface of the original mounting table glass 2.

A motor 8 is fixed to the scanning unit 3 and is a two-phase stepping motor, as will be described in detail later herein. The stepping motor 8 has coil terminals 8A, 8B, 8C and 8D. A worm gear 9 is fixed to the output shaft of the stepping motor 8. A pulley member 10 is rotatably mounted on a shaft 3D provided on the scanning unit 3. The pulley member 10 is composed of a helical gear part 10A, which meshes with the worm gear 9, and a pulley part 10B. The pulley member 10 is arranged to be rotatable within a plane which is parallel with the original mounting table glass 2. The arrangement for having the rotating plane of the pulley member 10 in parallel with the original mounting table glass 2 permits reduction in thickness of the body of the image reading apparatus, so that the image reading apparatus can be compactly arranged.

A retainer piece 11 is fixed to the fore end of the shaft 3D of the scanning unit 3 and is arranged to prevent the pulley member 10 from pulling out. A tension coiled spring 12 is used as an elastic means. One end of the tension coiled spring 12 is attached to a hook 1A of the body frame 1. The other end of the tension coiled spring 12 is attached to a wire 13. The wire 13 has its one end fixed to the body frame 1 while the other end thereof is attached to the tension coiled spring 12. The wire 13 is thus substantially fixed to the two ends of the body frame 1, although it is attached to the body frame 1 through the tension coiled spring 12.

An electric control circuit 14 is attached to the bottom surface of the body frame 1 and is arranged to drive and control the motor 8 and the scanning unit 3.

A flexible printed circuit board 15 has its one end connected to the electric control circuit 14. The other end of the flexible printed circuit board 15 is connected to the scanning unit 3 or, to be more specific, to the illumination light source 3A, the light receiving element 3B and the coil terminals of the stepping motor 8. Therefore, with the parts of the flexible printed circuit board 15 where the circuit board 15 is connected to the light source 3A, to the light receiving element 3B and to the coil terminals firmly fixed to the bottom surface of the scanning unit 3, the stepping motor 8 is fixed to the scanning unit 3. In addition to this, the stepping motor 8 may be more firmly fixed in position by sticking the armor of the stepping motor 8 to the scanning unit 3 with an adhesive or the like.

As shown in FIG. 4, the wire 13 is wound around the pulley part 10B of the pulley member 10. To be more specific, the wire 13 is wound just by an integer number of complete turns (an integer times) around the pulley part 10B, as shown in FIG. 5. In other words, the wire 13 is wound in such a way that its parts "a" and "b" before and after the winding intersection point P of the pulley part 10B are in parallel with each other. Therefore, the tension of the wire 13 never acts as side pressure on the pulley part 10B, i.e., it never acts in the direction of arrow "c" as shown in FIG. 5. This arrangement increases the durability of the rotating shaft of the pulley part 10B, minimizes a damage caused by friction and also makes a driving load smaller. This arrangement thus allows use of a smaller motor which permits reduction in size and in power consumption of the image reading apparatus.

Since the wire 13 is fixed to the body frame 1 through the spring 12 which is employed as an elastic means, the wire 13 can have a stable and large tension. Besides, a frictional force acting between the pulley part 10B and the wire 13 is stabilized by the use of the spring 12.

When the motor 8 is driven, the driving force of the motor 8 comes to rotate the pulley part 10B through the worm gear 9 and the helical gear part 10A of the pulley member 10. Then, the rotating force of the pulley part 10B causes the scanning unit 3 to be moved in parallel with the surface of the original mounting table glass 2 by friction between the wire 13 and the pulley part 10B of the pulley member 10.

Since the wire 13 is wound exactly by an integer number of turns around the pulley part 10B of the pulley member 10 as mentioned above, the tension of the wire 13 never acts as side pressure (in the direction of arrow "c") on the pulley part 10B. Therefore, the spring 12 which is employed as an elastic means is allowed to exert its tensile force over a wide range. Even if some parts have errors in assembling them, the wide range of the tensile force of the spring 12 absorbs such errors, so that the cost of assembly can be lessened.

The motor 8 is arranged to be fixed to the scanning unit 3 through the flexible printed circuit board 15. That arrangement has an advantage in that one and the same member, namely, the flexible printed circuit board 15, can be used for electrically connecting the electric control circuit 14 to the coil terminals and also to the scanning unit 3, i.e., the illumination light source 3A and the light receiving element 3B. Even if the electrical connection is not made with the one and the same member, it can be made by wiring with lines in about the same manner. The cost of assembly can be lessened by this arrangement. Another advantage of this arrangement lies in that the connector part of the apparatus can be compactly arranged to contribute to reduction in size of the apparatus. Further, since the electrical connection can be made with a single flexible printed circuit board 15, the cost of parts such as lead wires of the motor, etc., becomes lower.

As for the motor 8 which is arranged to move the scanning unit 3, a two-phase stepping motor is better than an ordinary DC motor in respect of controllability and cost. In the case of the present embodiment, the four coil terminals of the two-phase stepping motor 8 are arranged to protrude from a side surface of the cylindrical armor of the motor 8 in the same direction.

As shown in FIG. 3, the stepping motor 8 is mounted on the scanning unit 3 through the flexible printed circuit board 15 in such a way that a flat surface on which the four coil terminals are located extend in parallel with the bottom surface of the scanning unit 3. By virtue of this arrangement, the coil terminals of the motor 8 can be soldered to the flexible printed circuit board 15 on one and the same plane as the flexible printed circuit board 15 which is connected to the light receiving element 3B and the light projecting element (illumination light source) 3A of the scanning unit 3. Therefore, the arrangement effectively prevents any unnecessary load from being imposed on the flexible printed circuit board 15, facilitates the soldering work and also prevents a trouble such as damaging the flexible printed circuit board 15 in assembling.

As mentioned above, the four coil terminals are arranged to protrude from a side surface of the two-phase stepping motor 8 of cylindrical shape in the same direction. With the stepping motor 8 mounted on the scanning unit 3 like in one body therewith in such a way as to have a plane which is formed by the four protruding coil terminals in parallel with the moving plane of the scanning unit 3, the whole apparatus can be compactly arranged.

Further, the stepping motor 8 used in the present embodiment is in such a shape that the diameter D and the length L of the motor 8 are in a relation of "L≧D". With the stepping motor 8 formed in this shape, the height or thickness of the scanning unit 3 including the motor 8 can be thinly arranged to make the apparatus thinner.

In the stepping motor 8, a cylindrical rotor which is made of a permanent magnet is evenly divided in the direction of its circumference. The divided parts are magnetized in such a way as to alternately have different poles. A first coil, the rotor and a second coil are serially arranged in the axial direction of the cylindrical rotor. A first outer magnetic pole and a first inner magnetic pole which are arranged to be excited by the first coil are respectively opposed to the outer and inner circumferential surfaces of the cylindrical rotor. A second outer magnetic pole and a second inner magnetic pole which are arranged to be excited by the second coil are also respectively opposed to the outer and inner circumferential surfaces of the rotor. Thus, a rotary shaft which is the shaft of the rotor is formed to extend from inside of the cylindrical permanent magnet.

Since the first coil, the rotor and the second coil are serially arranged in the axial direction of the cylindrical rotor as described above, the dimension of the stepping motor 8 in the longitudinal direction, i.e., in the direction of the output shaft tends to become long. However, the stepping motor 8 can be arranged to have a small diameter and yet to give a large output.

Figure 7:
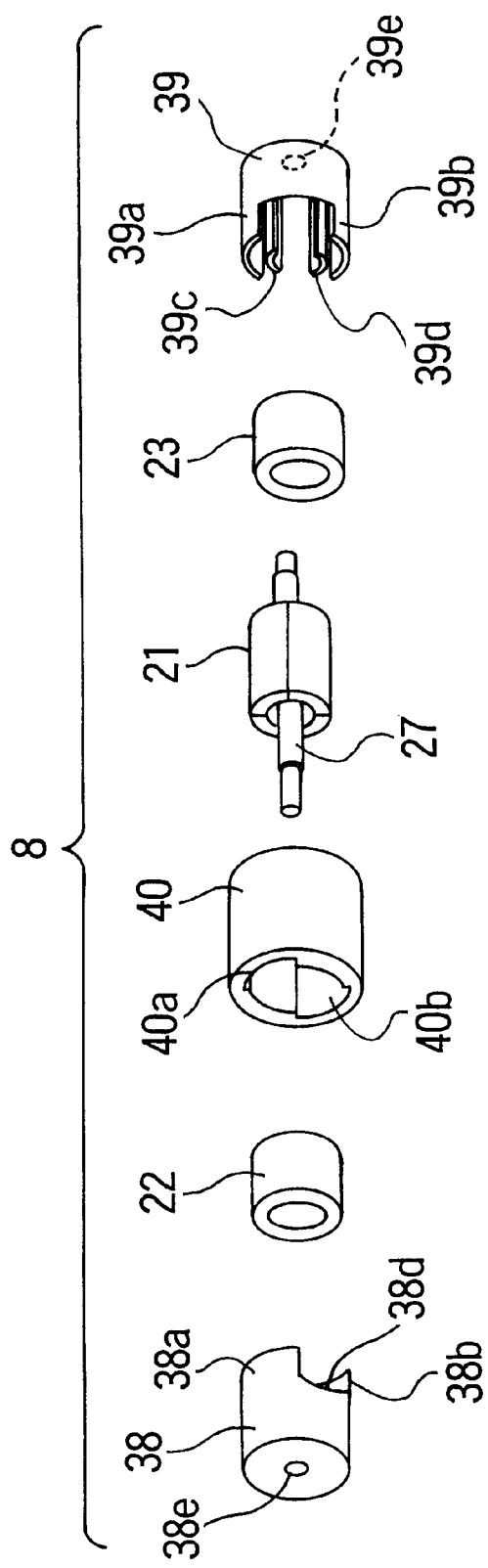
FIG. 7 is an exploded view of a stepping motor employed in the image reading apparatus shown in FIG. 1.
Figure 8:
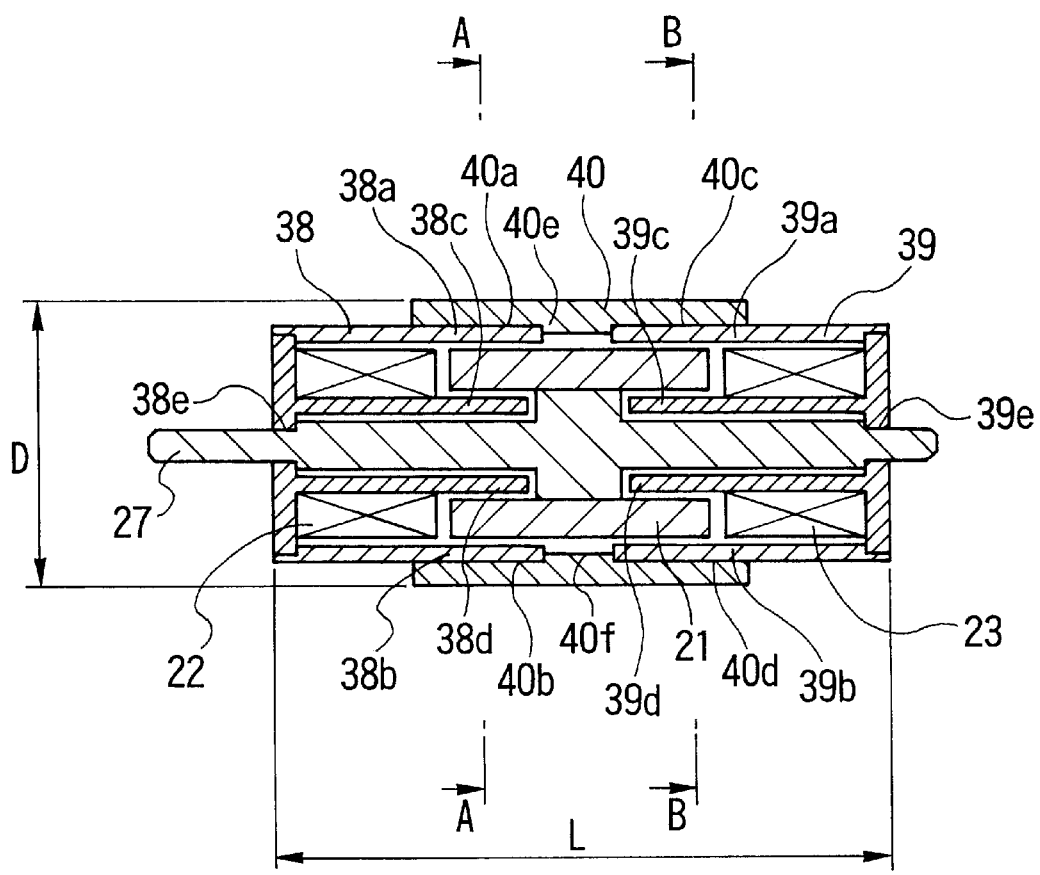
FIG. 8 is a sectional view of the stepping motor shown in FIG. 7 in a completely assembled state.

FIG. 7 to FIGS. 9(a) to 9(h) show in detail the arrangement of the stepping motor 8. FIG. 7 shows the stepping motor 8 in an exploded perspective view. FIG. 8 shows the stepping motor 8 in an axial sectional view as in an assembled state. FIGS. 9(a) to 9(d) show the stepping motor 8 in a sectional view taken on a line A—A of FIG. 8, and FIGS. 9(e) to 9(h) show the stepping motor 8 in a sectional view taken on a line B—B of FIG. 8.

In FIG. 7 to FIGS. 9(a) to 9(h), reference numeral 21 denotes a magnet of cylindrical shape which forms the rotor. The outer circumferential surface of the magnet 21 is divided into n parts (four parts in this case) in the direction of its circumference. The divided parts are magnetized, as magnetized parts 21a, 21b, 21c and 21d, to alternately have an S pole and an N pole. The magnetized parts 21a and 21c have S poles while the magnetized parts 21b and 21d have N poles. An output shaft 27, which serves as a rotor shaft, is fixed to the magnet 21. The output shaft 27 and the magnet 21 jointly form the rotor. Cylindrical coils 22 and 23 are coaxial with the magnet 21 and are disposed in positions where they sandwich the magnet 21 in between them in the axial direction. The coils 22 and 23 have outside diameters which are about equal to the outside diameter of the cylindrical magnet 21.

First and second stators 38 and 39 are made of a soft magnetic material. The phases of the first and second stators 38 and 39 are arranged to deviate 180/n degrees, i.e., 45 degrees, from each other. Each of the first and second stators 38 and 39 is composed of outer and inner tubes. The coil 22 is interposed in between the outer and inner tubes of the first stator 38. The first stator 38 is arranged to be excited by energizing the coil 22. The fore end parts of the outer and inner tubes of the first stator 38 form respectively outer magnetic poles 38a and 38b and inner magnetic poles 38c and 38d. To make the phases of the inner magnetic poles 38c and 38d inphase, they are formed to deviate 360/(n/2), i.e., 180, degrees from each other. The outer magnetic pole 38a is allocated opposite to the inner magnetic pole 38c. The outer magnetic pole 38b is allocated opposite to the inner magnetic pole 38d.

The outer magnetic poles 38a and 38b and inner magnetic poles 38c and 38d of the first stator 38 are arranged to have one end side of the (permanent) magnet 21 inserted in between them in such a way as to respectively confront the outer and inner circumferential surfaces on this end side of the magnet 21. Further, one end part of the rotating shaft 27 is rotatably fitted into a hole 38e provided in the first stator 38.

The coil 23 is interposed in between the outer and inner tubes of the second stator 39. The second stator 39 is arranged to be exited by energizing the coil 23. The fore end parts of the outer tube of the second stator 39 form outer magnetic poles 39a and 39b while the fore end parts of the inner tube of the second stator 39 form inner magnetic poles 39c and 39d. To make the phases of the inner magnetic poles 39c and 39d inphase, they are formed to deviate 360/(n/2), i.e., 180, degrees from each other. The outer magnetic pole 39a is allocated opposite to the inner magnetic pole 39c. The outer magnetic pole 39b is allocated opposite to the inner magnetic pole 39d. The outer magnetic poles 39a and 39b and inner magnetic poles 39c and 39d of the second stator 39 are arranged to have the other end side of the permanent magnet 21 inserted in between them in such a way as to respectively confront the outer and inner circumferential surfaces on that end side of the magnet 21. Further, the other end part of the rotating shaft 27 is rotatably fitted into a hole 39e provided in the second stator 39.

Therefore, a magnetic flux generated by the coil 22 comes across the magnet 21 which is a rotor interposed in between the outer magnetic poles 38a and 38b and the inner magnetic poles 38c and 38d. The magnetic flux is thus arranged to effectively act on the magnet 21. A magnetic flux generated by the other coil 23 comes also across the rotor magnet 21 between the outer magnetic poles 39a and 39b and the inner magnetic poles 39c and 39d to effectively act on the magnet 21. The output of the stepping motor 8 thus can be enhanced.

A connection ring 40 is made of a non-magnetic material in an cylindrical shape. Grooves 40a and 40b are formed in a part of the connection ring 40 on one inner end side of the connection ring 40. Grooves 40c and 40d are formed in a part on the other inner end side of the connection ring 40. The phases of the grooves 40c and 40d are arranged to deviate 45 degrees from those of the grooves 40a and 40b. The outer magnetic poles 38a and 38b of the first stator 38 are fitted into the grooves 40a and 40b. The outer magnetic poles 39a and 39b of the second stator 39 are fitted into the grooves 40c and 40d. The first and second stators 38 and 39 are attached to the connection ring 40 by fixing these fitting engagement parts with an adhesive. The first stator 38 and the second stator 39 are fixed to the connection ring 40 at a spacing distance as much as the width of the inner projections 40e and 40f formed on the inner side of the connection ring 40. The first and second stators 38 and 39 are thus fixed to the connection ring in a state of having the fore ends of the outer magnetic poles 38a and 38b and the inner magnetic poles 38c and 38d located respectively opposite to the fore ends of the outer magnetic poles 39a and 39b and the inner magnetic poles 39c and 39d.

FIG. 8 is a sectional view of the stepping motor 8. FIGS. 9(a), 9(b), 9(c) and 9(d) are sectional views of the stepping motor 8 taken on a line A—A of FIG. 8. FIGS. 9(e), 9(f), 9(g) and 9(h) are sectional views of the stepping motor 8 taken on a line B—B of FIG. 8. Of these figures, FIGS. 9(a) and 9(e) show the state of the stepping motor 8 obtained at the same time point. FIGS. 9(b) and 9(f) show the state of the stepping motor 8 obtained at the same time point. FIGS. 9(c) and 9(g) show the state of the stepping motor 8 obtained at the same time point. FIGS. 9(d) and 9(h) show the state of the stepping motor 8 obtained at the same time point.

Next, the operation of the stepping motor 8 will be described. In the state shown in FIGS. 9(a) and 9(e), when the coils 22 and 23 are energized to excite the outer magnetic poles 38a and 38b of the first stator 38 into N poles, the inner magnetic poles 38c and 38d of the first stator 38 into S poles, the outer magnetic poles 39a and 39b of the second stator 39 into S poles and the inner magnetic poles 39c and 39d of the second stator 39 into N poles, the magnet 21 which serves as a rotor rotates 45 degrees counterclockwise to bring about the state shown in FIGS. 9(b) and 9(f).

After that, the coil 22 is inversely energized to excite the outer magnetic poles 38a and 38b of the first stator 38 into S poles, the inner magnetic poles 38c and 38d of the first stator 38 into N poles, the outer magnetic poles 39a and 39b of the second stator 39 into S poles and the inner magnetic poles 39c and 39d into N poles. The magnet 21 then rotates further counterclockwise 45 degrees to bring about the state shown in FIGS. 9(c) and 9(g).

Next, the other coil 23 is inversely energized to excite the outer magnetic poles 39a and 39b of the second stator 39 into N poles, the inner magnetic poles 39c and 39d of the second stator 39 into S poles, the outer magnetic poles 38a and 38b of the first stator 38 into S poles and the inner magnetic poles 38c and 38d of the first stator 38 into N poles. The magnet 21 then rotates further counterclockwise 45 degrees to bring about the state shown in FIGS. 9(d) and 9(h). After that, the directions in which the coils 22 and 23 are energized are serially changed from one direction over to the other. The changes in energizing direction cause the magnet 21 which serves as a rotor to rotate from one position to another according to the energizing phase.

The stepping motor which is arranged in this manner is best suited for minimizing the size of the motor. The features of the basic arrangement of the stepping motor 8 are as follows. Firstly, the magnet is formed in a hollow cylindrical shape. Second, the outer circumferential surface of the magnet is divided into n parts in the direction of circumference. These n divided parts are magnetized to alternately have different poles. Third, the first coil, the magnet and the second coil are allocated in the axial direction of the magnet one after another in that order. Fourth, the outer and inner magnetic poles of the first and second stators to be excited by the first and second coils are opposed to the outer and inner circumferential surfaces of the magnet.

This arrangement permits arranging the stepping motor to have its diameter just large enough for having the magnetic poles of the stators at their opposed positions. Further, the stepping motor can be arranged to have its axial length not more than a length obtained by adding the lengths of the first and second coils to the length of the magnet. Therefore, the size of the stepping motor is determined by the diameters and the lengths of the magnet and coils. The stepping motor thus can be arranged in an extremely compact size by arranging the diameters and the lengths of the magnet and the coils to be very small.

If the diameter and length of the magnet and the coils are extremely reduced, it tends to become difficult to have an adequate accuracy of the output of the stepping motor. However, the problem in respect of the output accuracy of the stepping motor is solved by the above-stated simple arrangement of having the outer and inner magnetic poles of the first and second stators opposed to the outer and inner circumferential surfaces of the magnet which is formed in the hollow cylindrical shape. The accuracy of the output of the stepping motor can be more effectively enhanced by magnetizing not only the outer circumferential surface of the magnet but also the inner circumferential surface of the magnet in the direction of its circumference.

According to the arrangement of the present embodiment, since the stepping motor 8 is arranged as described above, the thickness of the image reading apparatus can be compactly arranged even with the stepping motor 8 disposed in a state of being overlapped by the lower part of the scanning unit 3.

The invention is not limited to the arrangement of the embodiment disclosed. Various modifications and equivalent arrangements are possible within the spirit and scope of the appended claims.

What is claimed is:

1. An image reading apparatus comprising:

a scanning unit arranged to move along an original mounting table, said scanning unit including a reading element for reading an image of an original on said original mounting table;

a motor for driving said scanning unit, said motor being mounted on said scanning unit and having an output shaft disposed substantially parallel to said original mounting table;

a frame arranged to house said scanning unit and said motor, and on which said original mounting table is mounted;

a pulley mounted on said scanning unit and arranged to be rotated by rotation of said motor, wherein a rotating plane of said pulley is substantially parallel to said original mounting table; and a wire having one end fixed to said frame and another end fixed to said frame through elastic means, said wire being wound around said pulley, wherein said pulley moves along said wire upon being driven by said motor, thereby allowing said scanning unit to move along said original mounting table to read an image of the original.

2. An image reading apparatus according to claim 1, wherein a thickness of said motor in a direction perpendicular to said mounting table is less than a length of the output shaft.

\* \* \* \* \*